United States Patent [19]

Strom et al.

[11] Patent Number: 5,062,017
[45] Date of Patent: Oct. 29, 1991

[54] HOUR-GLASS DISK HEAD SLIDER

[75] Inventors: Richard A. Strom, Eagan; Peter Crane, Minneapolis; Robert E. Chapin, Burnsville, all of Minn.

[73] Assignee: Seagate Technology, Inc., Scotts Valley, Calif.

[21] Appl. No.: 528,936

[22] Filed: May 25, 1990

[51] Int. Cl.⁵ .............................. G11B 5/60
[52] U.S. Cl. ................................. 360/103
[58] Field of Search ......................... 360/103

[56] References Cited

U.S. PATENT DOCUMENTS

| | | | |
|---|---|---|---|
| 4,218,715 | 8/1980 | Garnier | 360/103 |
| 4,475,135 | 10/1984 | Warner et al. | 360/103 |
| 4,673,996 | 6/1987 | White | 360/103 |
| 4,700,248 | 10/1987 | Coughlin et al. | 360/103 |
| 4,734,803 | 3/1988 | Nishihira | 360/103 |
| 4,961,121 | 10/1990 | Astheimer et al. | 360/103 |

FOREIGN PATENT DOCUMENTS

| | | | |
|---|---|---|---|
| 60-101781 | 6/1985 | Japan | 360/103 |
| 61-204878 | 9/1986 | Japan | 360/103 |

Primary Examiner—Robert S. Tupper
Attorney, Agent, or Firm—Kinney & Lange

[57] ABSTRACT

An air bearing slider for supporting an electromagnetic transducer over a rotating disk. The slider comprises a slider body having a leading edge, a trailing edge and first and second side edges. First and second side rails are positioned along the first and second side edges, respectively, and form air bearing surfaces with inside and outside edges. The inside and outside edges converge from the leading edge to a break and diverge from the break to the trailing edge.

33 Claims, 6 Drawing Sheets

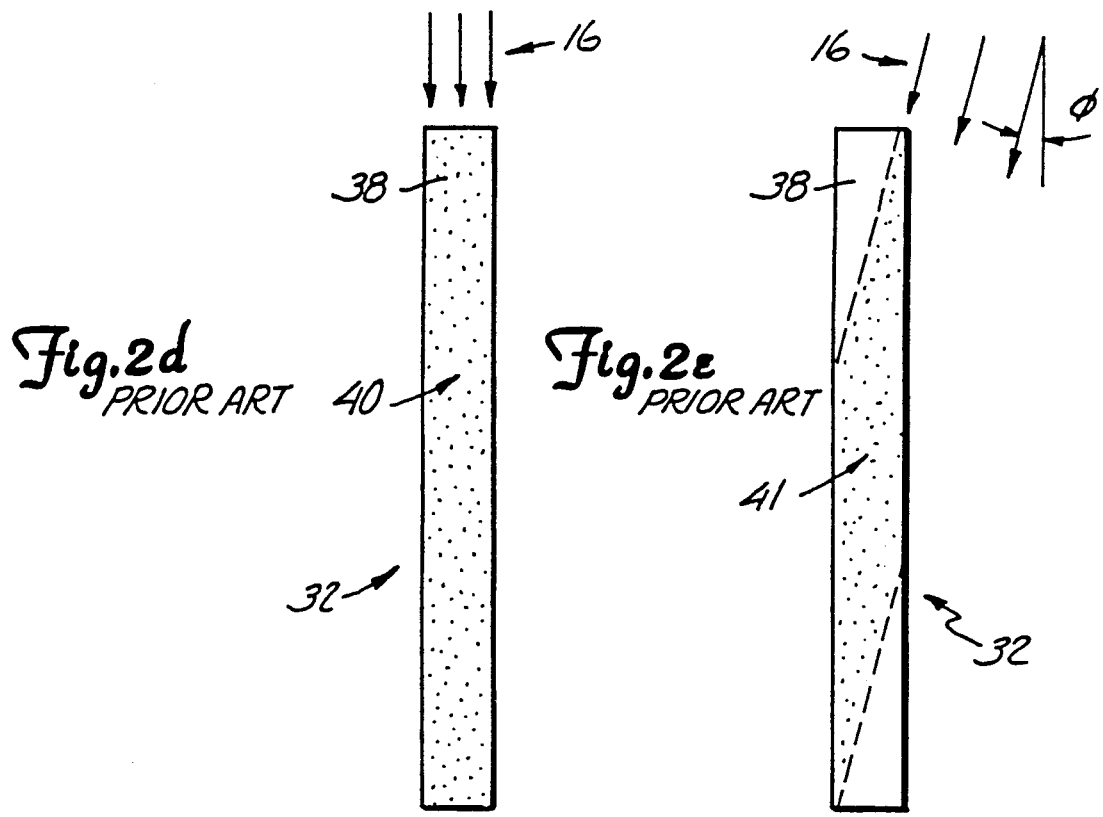
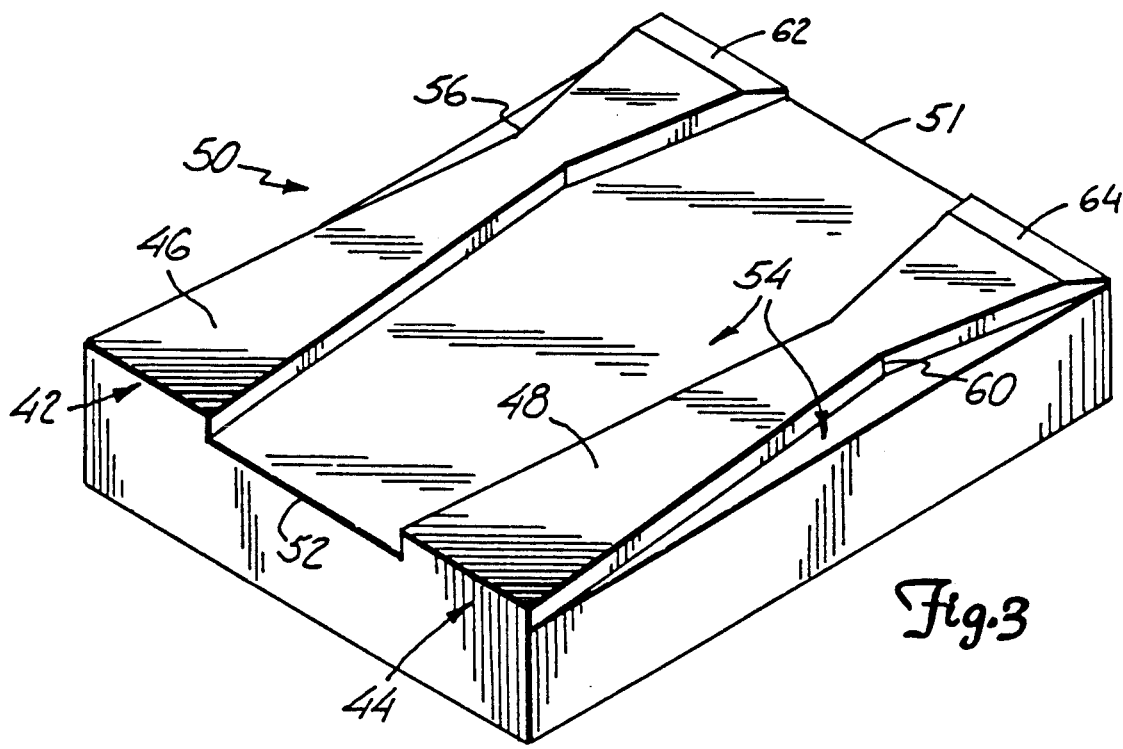

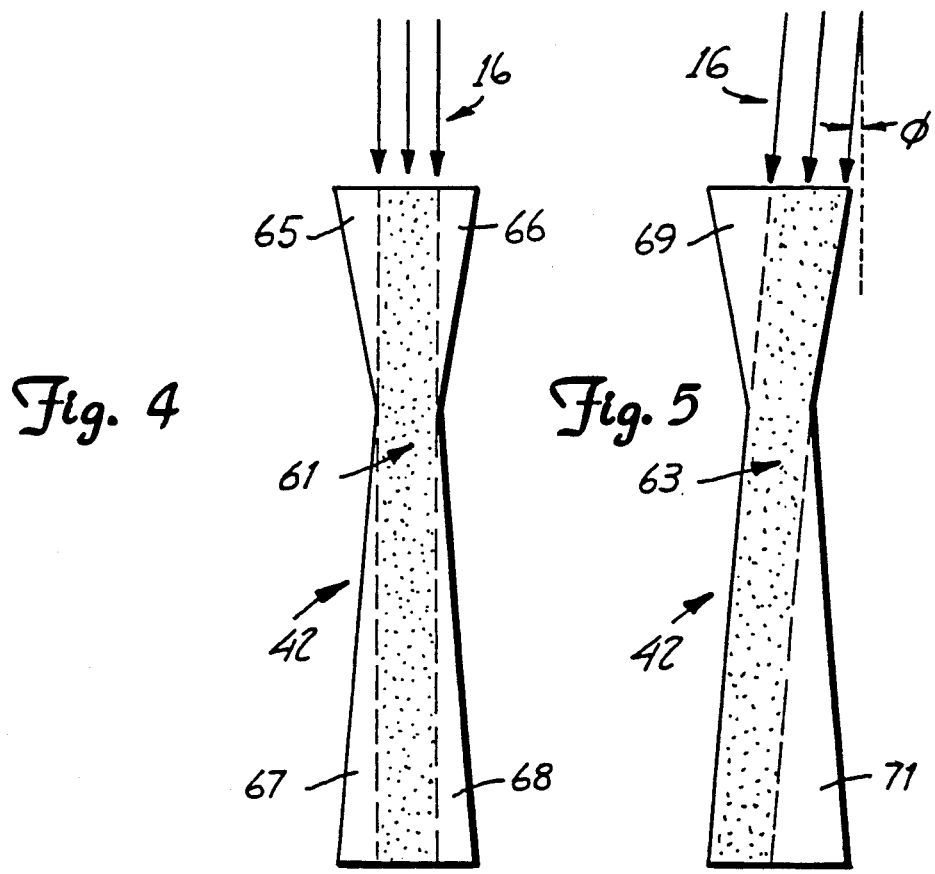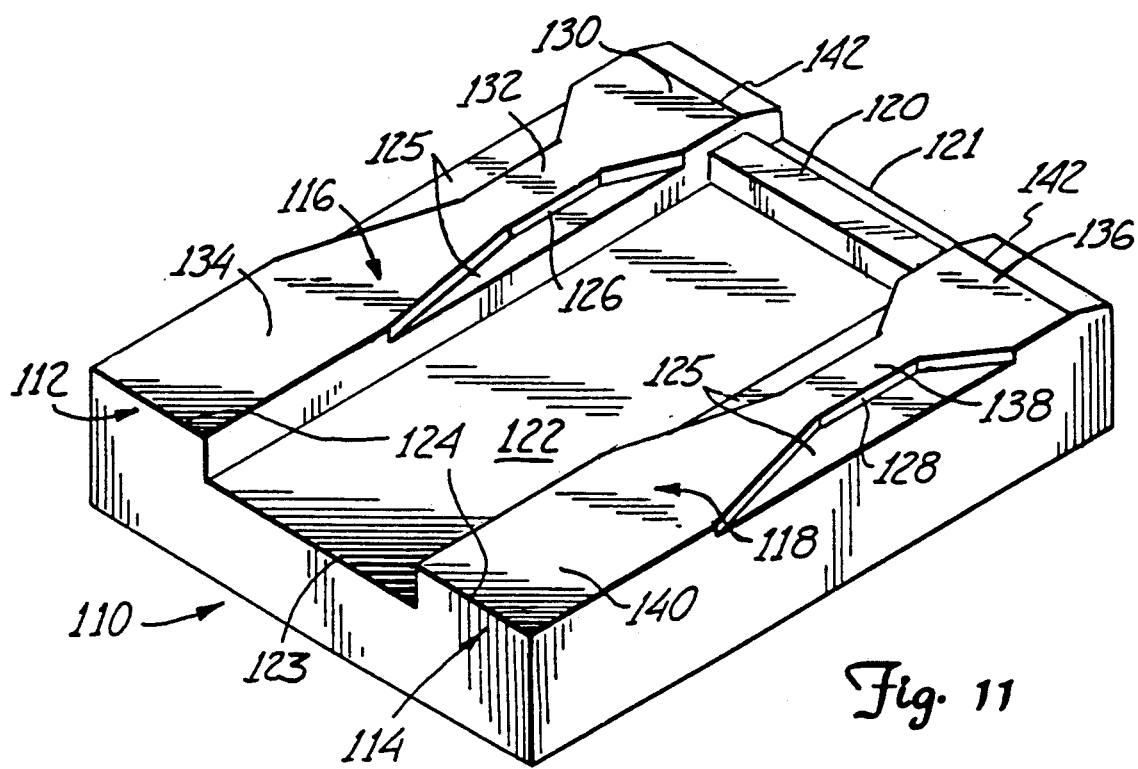

HOUR-GLASS DISK HEAD SLIDER

BACKGROUND OF THE INVENTION

The present invention relates to transducer head assemblies for rotating disk drives, and more particularly to air bearing disk head sliders for use with rotary actuators.

Transducer head assemblies that "fly" relative to a rotating disk are used extensively in rotating disk drives. The assemblies include an air bearing slider for carrying a magnetic transducer proximate the rotating disk. FIG. 1 illustrates a slider 10 supported by a gimbal 11 over a disk 14. The gimbal 11 is secured to an arm 12. The arm 12 positions the slider 10 over individual data tracks on the disk 14 (not shown) along an arc 18. As the disk 14 rotates, it generates wind or air flow in the direction shown by arrows 16 (wind 16). The wind 16 is approximately parallel to the disk's tangential velocity, indicated by an arrow 22. The wind cooperates with the slider 10 to provide lift which allows the slider to fly above the disk 14.

The gimbal 11 is a resilient spring that allows the slider 10 to follow the topography of the disk 14. The gimbal 11 includes a dimple (not shown) that is in point contact with the slider 10. The dimple provides a pivot about which the slider 10 can pitch and roll while following the topography of the disk 14.

When the slider 10 is positioned near the outside edge of the disk 14, its longitudinal axis 20 is substantially parallel to the wind direction. Near the center of the disk 14, the slider 10 is skewed with respect to the wind direction as illustrated by a skew angle φ. The skew angle φ is measured between the longitudinal axis 20 and the wind 16.

The elements described to this point may be conventional in design and are described and shown in FIGS. 1 and 2a-2e to facilitate an understanding of the present invention. Throughout the FIGS., elements of the same design are designated by identical reference numerals.

FIG. 2a is a perspective view of a head-gimbal assembly having a conventional catamaran slider 30. The slider 30 is secured to the gimbal 11 in any known manner. The slider 30 and the gimbal 11 are supported by the arm 12. Rails 32 and 34, positioned along edges of the slider 30, form air bearing surfaces on which the slider flies, in known manner.

FIG. 2b is an end view of the slider 30 as seen from line 2B—2B of FIG. 2a. The arm 12 and the gimbal 11 support the slider 30 above the disk 14. The slider 30 includes the rails 32 and 34 which carry transducers 35 and 37. The rails 32 and 34 include air bearing surfaces 38 and 39 which provide lift to the slider 30, as described more fully below.

Flying height is viewed as one of the most critical parameters of non-contact recording. As the average flying height of the slider 30 decreases, the transducers 35 and 37 achieve greater resolution between individual data bit locations on the disk 14. Therefore, it is desirable to have the transducers 35 and 37 fly as close to the disk 14 as possible.

FIG. 2c is a bottom plan view of the conventional catamaran slider 30 shown in FIGS. 2a and 2b. The rails 32 and 34 are positioned along edges of the slider 30 and are disposed about a recessed area 36 to form the air bearing surfaces 38 and 39. As the disk 14 rotates, the disk drags air (wind 16) under the slider 30 and along the air bearing surfaces 38 and 39. Under the air bearing surfaces 38 and 39, the air flow component due to the drag of the disk 14 is called "couette flow". As couette flow passes beneath the rails 32 and 34, the skin friction on the air bearing surfaces 38 and 39 causes the air pressure between the disk 14 and the air bearing surfaces to increase and to thereby provide lift causing the slider 30 to fly above the disk surface. Hence, the greater the air bearing surface area, the greater the lift.

The flying height is preferably uniform regardless of variable flying conditions, such as tangential velocity variation from inside to outside tracks, lateral slider movement during a seek, and varying skew angles φ. Catamaran sliders provide just enough air bearing surface area to fly at a proper height above the disk surface. For example, without the rails 32 and 34, the air bearing surface area would be too large. Consequently, the slider 30 would fly too far from the disk surface at a height adversely affecting resolution.

Although, conventional catamaran sliders are helpful in controlling flying height, they are very sensitive to skew angle φ. Even with moderate skew angles in the 10-15 degree range, flying height for a conventional catamaran slider is adversely influenced. Increasing skew angle φ at a fixed tangential velocity causes the air pressure distribution beneath the rails 32 and 34 to become distorted. This influences the net forces and torque acting upon the slider 30 and results in decreased flying height.

FIG. 2d is a bottom view of the rail 32 with the wind 16 applied at zero skew. The air bearing surface 38 has an effective area 40 at zero skew which is equal to the area of the air bearing surface 38. FIG. 2e illustrates the wind 16 applied to the rail 32 at skew angle φ. The air bearing surface 38 now has a smaller effective area 41. As the skew angle φ increases, the effective surface area of the rails 32 and 34 decreases. The decrease of effective surface area at skew is caused by side leakage. The air that leaks out the sides of the rails 32 and 34 is not available to generate pressure under the rails. This causes a loss of pressure beneath the rails 32 and 34 resulting in a lower flying height at greater skew. To prevent the slider 30 from ultimately contacting the disk surface at large skew angles, the slider's average flying height must be appropriately increased. Resolution is therefore sacrificed. Further, the pressurization of one rail may differ from the pressurization of the other rail at skew. This difference causes the slider 30 to roll. In other words, the rail 32 will fly at a different height than the rail 34 while the slider 30 flies at skew.

As disk drives become more compact for applications in smaller and more portable equipment, rotary actuators are increasingly employed. Further, the designer is motivated to use a shorter actuator pivot arm to make the disk drive even more compact. However, these actuators create rather large skew angles φ and consequently make flying height control more difficult. Rotary actuators cause the geometric orientation between longitudinal axis 20 (shown in FIG. 1) and the disk rotation tangent, to change as the arm 12 moves the slider 10 along the arc 18.

One approach to reducing sensitivity of the flying characteristics to varying skew angles is to provide edge blends extending along the length of each rail. As early as 1982, designers applied these blends to reduce wear caused by contact between each rail and the disk surface. The edge blends also reduced sensitivity of the flying characteristics to varying skew angles created by rotary actuators. For example, the pressurization distribution on each rail remained nearly constant relative to the slider's pivot point over varying skew angles. The benefits to flying characteristics became known in 1982 when the edge blends were used in combination with rotary actuators in 5¼ inch disk drives, such as the WREN family manufactured by IMPRIMIS Technology, Inc.

White U.S. Pat. No. 4,693,996 discloses a similar approach. The White patent shows transverse pressurization contours (TPC) on each rail that extend from the leading edges to the trailing edges. The TPCs provide a pressurization region across one side edge of each rail and a depressurization region across the opposite side edge such that the pressure distributions across the air bearing surfaces are substantially unaltered over varying skew angles.

SUMMARY OF THE INVENTION

The present invention provides an air bearing slider which reduces the effect of skew angle on flying height over a rotating disk. The slider comprises a slider body having a leading edge, a trailing edge, first and second side edges, and first and second side rails which create air bearing surfaces. The first and second side rails are positioned along the first and second side edges, respectively. The first and second side rails each extend between the leading edge and the trailing edge and have a surface configuration that includes a break. That is, each side rail surface decreases in width from the leading edge to the break and increases in width from the break to the trailing edge.

In one embodiment, the first and second side rails form an hour-glass catamaran slider which includes a recessed area disposed between the first and second side rails and extending from the leading edge to the trailing edge.

In another embodiment, the first and second side rails include edge steps extending between the leading edge and the trailing edge.

In another embodiment, each break is spaced from the leading edge by about one-third the length of the slider, as measured from the leading edge to the trailing edge.

In another embodiment, the air bearing surface has substantially equal widths at the leading and trailing edges and a width at the break which is substantially equal to one half the width at the leading and trailing edges.

In still another embodiment, the slider includes a cross-rail extending between the first and second side rails to form an hour-glass negative pressure air bearing (NPAB) slider. During operation, the cross-rail creates a negative pressure area between the cross-rail and the trailing edge.

BRIEF DESCRIPTION OF THE DRAWINGS

FIG. 2b is an end view of the head-gimbal assembly taken along line 2B—2B of FIG. 2a.

FIG. 2d is a bottom plan view of a conventional catamaran rail illustrating an effective air bearing surface area at zero skew.

FIG. 2e is a bottom plan view of the conventional catamaran rail illustrating an effective air bearing surface area at skew angle $\phi$.

FIG. 3 is a perspective view of an hour-glass catamaran slider in accordance with the present invention, as viewed from a trailing edge.

FIG. 4 is a bottom plan view of an hour-glass rail illustrating an effective air bearing surface area at zero skew.

FIG. 5 is a bottom plan view of an hour-glass rail illustrating an effective air bearing surface area at skew angle $\phi$.

FIG. is a perspective view of an alternative slider embodiment having hour-glass rails formed with shallow edge steps.

Figure 6:
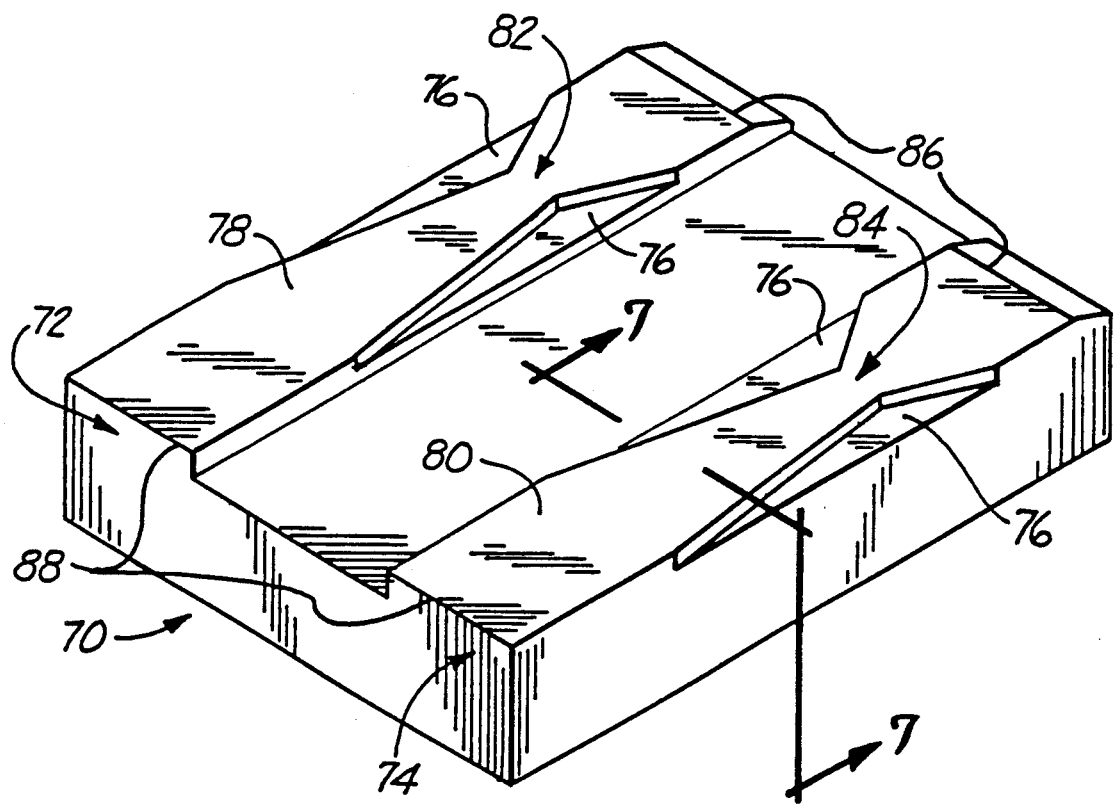
Figure 7:
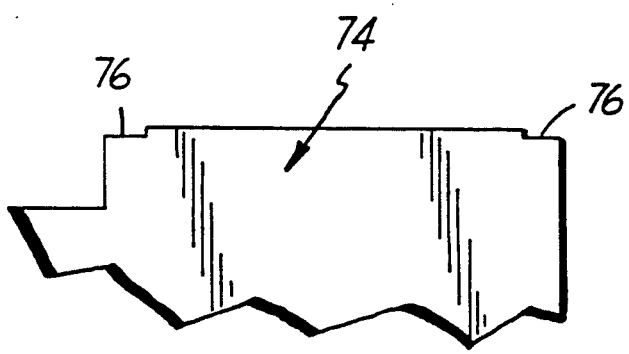

FIG. 7 is an enlarged sectional view taken along lines 7—7 of FIG. 6 of an hourglass rail having shallow edge steps.

Figure 8:
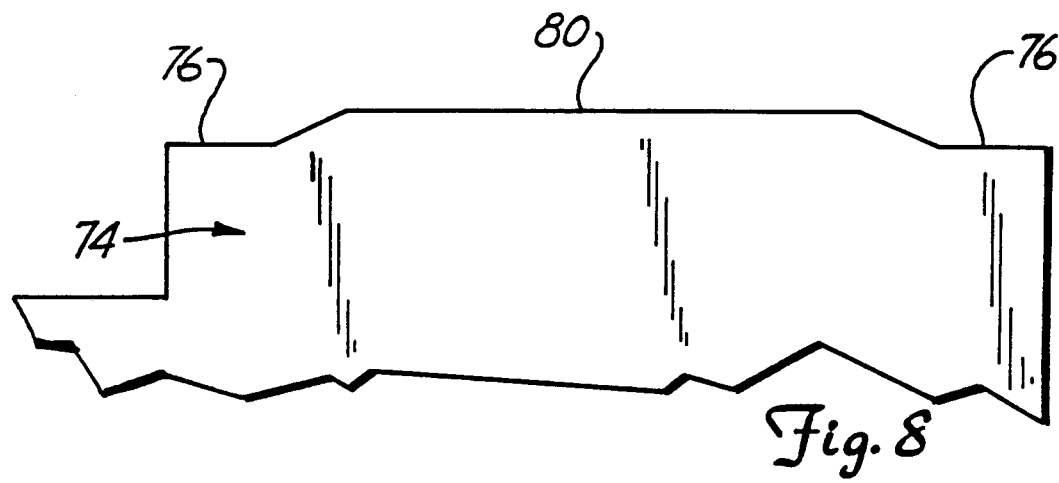

FIG. 8 is an enlarged sectional view taken along lines 7—7 of FIG. 6 of an hourglass rail having chamfered edge steps.

Figure 9:
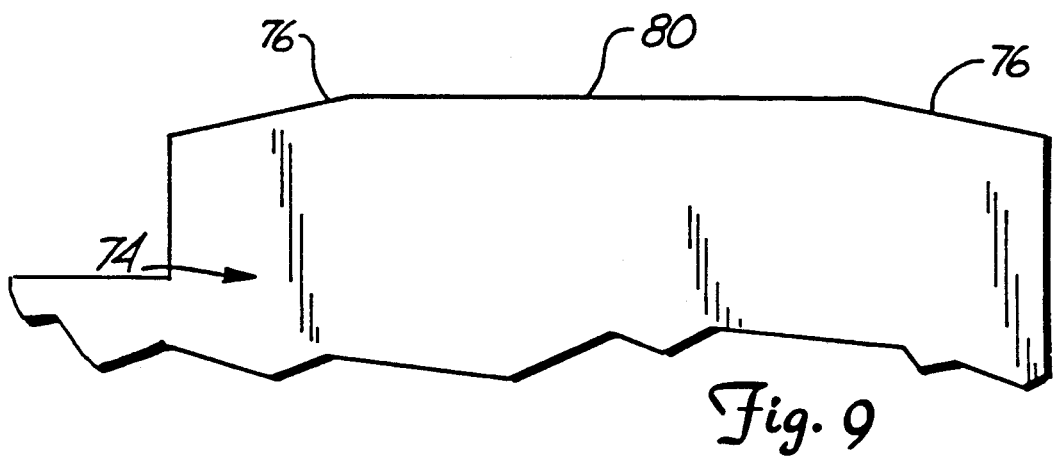
Figure 10:
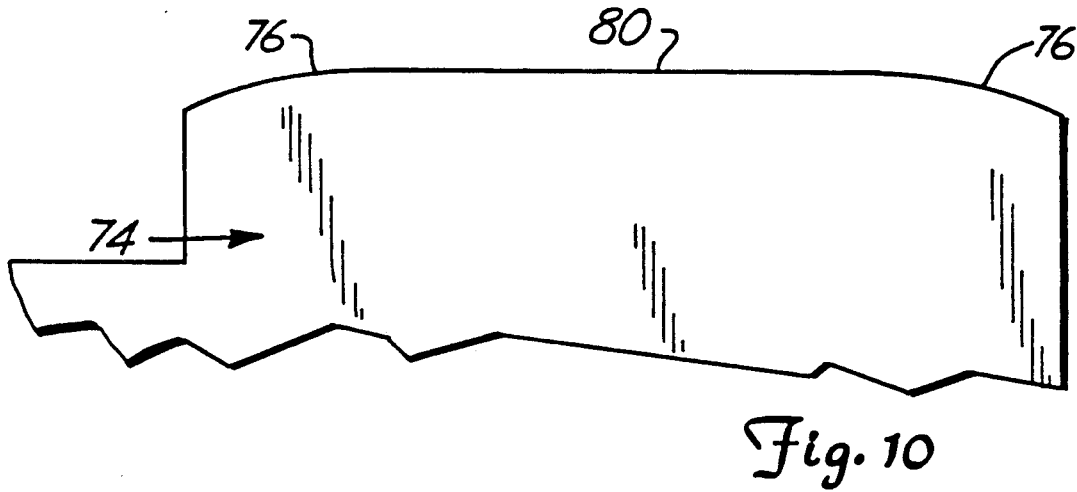

FIG. 9 is an enlarged sectional view taken along lines 7—7 of FIG. 6 of an hourglass rail having chamfered edges FIG. 10 is an enlarged sectional view taken along lines 7—7 of FIG. 6 of an hourglass rail having shallow edge blends.

FIG. 11 is a perspective view of an hour-glass NPAB slider in accordance with the present invention.

DETAILED DESCRIPTION OF THE PREFERRED EMBODIMENTS

FIG. 3 is a perspective view of an hour-glass catamaran slider 50 in accordance with the present invention, as viewed from a trailing edge 52. The slider 50 includes a pair of projecting rails 42 and 44 having air bearing surfaces 46 and 48, respectively. The rails 42 and 44 extend from a leading edge 51 to the trailing edge 52. The slider 50 is a modified catamaran slider. The side rails 42 and 44 are not rectangular as are rails 32 and 34 shown in FIG. 2a. Instead, the rails 42 and 44 decrease in width from the leading edge 51 to breaks 56 and 60 and increase in width from the breaks 56 and 60 to the trailing edge 52. In other words, the rails 42 and 44 generally have "hour-glass" configurations. Each air bearing surface 46 and 48 has a width measured at the leading edge 51 that is approximately equal to a width measured at the trailing edge 52. The rails 42 and 44 are formed such that the air bearing surfaces 46 and 48 have widths at the breaks 56 and 60 which are substantially equal to one half of the widths measured at the leading edge 51 and the trailing edge 52. It should be understood that in any of the embodiments shown in the FIGS., the present invention does not require that the inside and outside edges of the air bearing surfaces be straight—the edges may be curved from the leading edge of the slider to the trailing edge.

Figure 1:
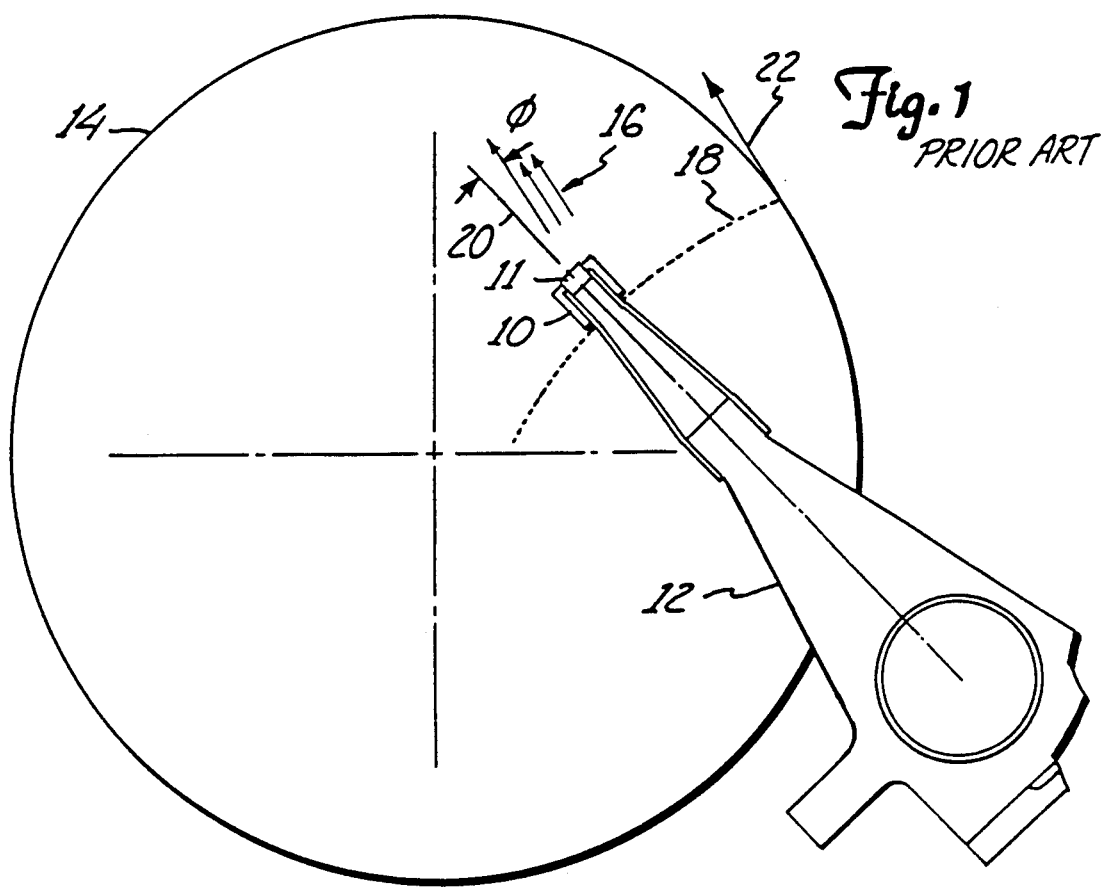
FIG. 1 is a top plan view of an air bearing slider supported above a rotating disk.

The slider 50 is secured to an actuator arm in any known manner. For example, the slider 50 may be secured to the actuator arm 12 shown in FIGS. 1, 2a and 2b. As the disk 14 rotates, air flow between the slider 50 and the disk 14 pressurizes the air bearing surfaces 46 and 48 and lifts the slider 50 several microinches above the surface of the disk 14. In a preferred embodiment, the slider 50 flies about 8 microinches above the disk surface when the disk 14 rotates at about 1000 inches/second. To provide faster take off when the disk begins to rotate, the rails 42 and 44 include leading edge tapers 62 and 64. The tapers 62 and 64 provide faster take off by smoothing pressure transitions between ambient air and pressurized air beneath the rails 42 and 44. Faster take off decreases the length of time the slider 50 slides on the disk surface before it begins to fly and thereby decreases wear on both the slider 50 and the disk 14.

The hour-glass rails 42 and 44 are formed by etching with an ion beam. This forming process is known as ion milling. FIG. 3 illustrates a "deep" etch in which the rails 42 and 44 project out from recessed areas 54 by about 25 microns. Virtually no air pressure builds up on the recessed areas 54. Alternatively, the rails 42 and 44 may be formed with a laser or a similar etching technique.

FIGS. 4 and 5 are bottom plan views of the hourglass rail 42 in FIG. 3 and illustrate effective air bearing surface areas at different skew angles. For simplicity of illustration and analysis, the effective areas of positive pressure are indicated generally by effective areas 61 and 63. In FIG. 4, the rail 42 is shown at zero skew with respect to the wind 16. The effective area 61 develops positive pressure along the entire length of the rail 42. Triangular areas 65, 66, 67 and 68 develop some additional positive pressure. FIG. 5 illustrates the rail 42 at skew angle $\phi$ with respect to the wind 16. The effective areas 61 and 63 are substantially equal. As a result, pressurization and flying height of the rails 42 and 44 are more constant over varying skew angles than the conventional catamaran slider 30 (shown in FIGS. 2a-2e). Triangular areas 69 and 71 also develop some positive pressure but tend to balance with the areas 65, 66, 67 and 68 at varying skew angles $\phi$. Since the slider 50 has less variation in flying height, the average fly height may be reduced in order to obtain greater resolution on the individual bit positions on the disk 14 without risk of the slider 50 contacting the disk surface at high skew angles.

FIG. 6 is a perspective view of an alternative slider embodiment. A slider 70 has hour-glass rails 72 and 74 with etches that form "shallow" edge steps or blends 76. The edge steps 76 form inside and outside surfaces that are recessed from air bearing surfaces 78 and 80 by about 0 to 2.0 microns. The edge steps 76 are positioned along each rail, between leading edges 86 and trailing edges 88, to form the hourglass shapes of the air bearing surfaces 78 and 80. When the slider 70 flies at skew angle $\phi$ (shown in FIG. 5), the recessed surfaces accumulate additional pressure that prevents the slider 70 from losing flying height. This results in a more even flying height over varying skew angles $\phi$.

In addition to flying height, another critical flying characteristic is roll. At varying skew angles, sliders tend to roll about their longitudinal axis. Roll is caused by shifts in the pressure distributions across the air bearing surfaces 78 and 80 relative to the slider pivot point. To reduce roll and to obtain overall optimum flying characteristics, the dimensions of the air bearing surfaces 78 and 80 and the edge steps 76 must be adjusted to minimize shifts in pressure distribution. For example, the edge steps 76 on the inner and outer edges of each rail may be formed asymmetrically, with the inside surfaces wider, or having a larger indentation, than the outside surfaces, for example. It should be known that the recessed inside and outside surfaces may be formed with different dimensions and may vary from one rail to the other.

In FIG. 6, breaks 82 and 84 are positioned closer to the leading edges 86 than to the trailing edges 88. The breaks 82 and 84 preferably are spaced from the leading edges 86 by approximately one-third the length of the slider 70. Positioning of the breaks 82 and 84 may be varied in alternative embodiments (not shown) to vary flying characteristics, such as pitch. Pitch is measured by an angle between the disk surface and a plane generally defined by the air bearing surfaces 78 and 80.

When the slider 70 has a positive pitch, the leading edges 86 typically fly at greater distances from the disk surface than the trailing edges 88. Increasing the pitch angle provides for faster takeoff when the disk begins to rotate. Positive pitch also reduces the risk of a "head crash". When the leading edges 86 fly at greater distances from the disk surface than the trailing edges 88, the air bearing surfaces 78 and 80 tend to resist a negative pitch in which the leading edges 86 will crash into the disk surface. However, too large of a positive pitch adversely affects stiffness or stability of the trailing edges 88. A small positive pitch increases the stiffness of the trailing edges 88. Since transducers, such as transducers 35 and 37 (shown in FIG. 2b), are typically positioned on the trailing edges 88, increased stability will increase performance of read and write operations. If the slider 70 flies with too small of a positive pitch, a bump may cause the slider to rotate into a negative pitch and crash into the disk surface.

Pitch must be accurately controlled to achieve optimum flying characteristics. The pitch angle is adjusted by varying the pressure gradients along the air bearing surfaces 78 and 80. The breaks 82 and 84 may be positioned closer to either the leading edges 86 or the trailing edges 88 to vary pressure distribution along the air bearing surfaces 78 and 80. Typical pitch angles range from about 100 to about 300 micro-radians.

As the disk 14 drags air (wind 16) beneath the rails 72 and 74, skin friction along the air bearing surfaces 78 and 80 causes the air pressure to increase. The breaks 82 and 84 divide the air bearing surfaces 78 and 80 into forward surfaces and rearward surfaces. The forward surfaces are adjacent the leading edges 86 and the rearward surfaces are adjacent the trailing edges 88. Positioned between the forward and rearward surfaces are central surfaces which are adjacent the breaks 82 and 84. Since the central surfaces have narrower air bearing surfaces than the forward surfaces, a portion of the air pressure bleeds off at the breaks 82 and 84. This portion is not available to pressurize the rearward air bearing surfaces. This results in greater air pressure toward the leading edges 86 and less air pressure toward the trailing edges 88, which causes the slider 70 to increase pitch angle. To reduce the pitch angle, the breaks 82 and 84 are positioned closer to the leading edges 86 than to the trailing edges 88. The resulting pressure distribution reduces the pressure on the forward air bearing surface areas and thereby reduces the pitch angle.

Since the air pressure bleeds off near the breaks in hour-glass rails, the average flying height of an hour-glass catamaran slider (with breaks) drops from that of a catamaran slider of the same width. Therefore, the air bearing surfaces 78 and 80 are formed wider near the leading and trailing edges 86 and 88 than the air bearing surfaces 38 and 39 of the conventional catamaran slider 30 shown in FIG. 2c. The edge steps 76 do not fully extend from the breaks 82 and 84 to the leading and trailing edges 86 and 88 but terminate prior to the leading and trailing edges. Terminating the edge steps 76 prior to the leading and trailing edges 86 and 88 maximizes the width of the air bearing surfaces 78 and 80 near the leading and trailing edges. The wider surfaces build up more air pressure and prevent the slider 70 from flying too close to the disk surface. The wider air bearing surfaces 78 and 80 also create more room to secure transducers on the trailing edges 88, such as the transducers 35 and 37 shown in FIG. 2b.

Figure 2A:
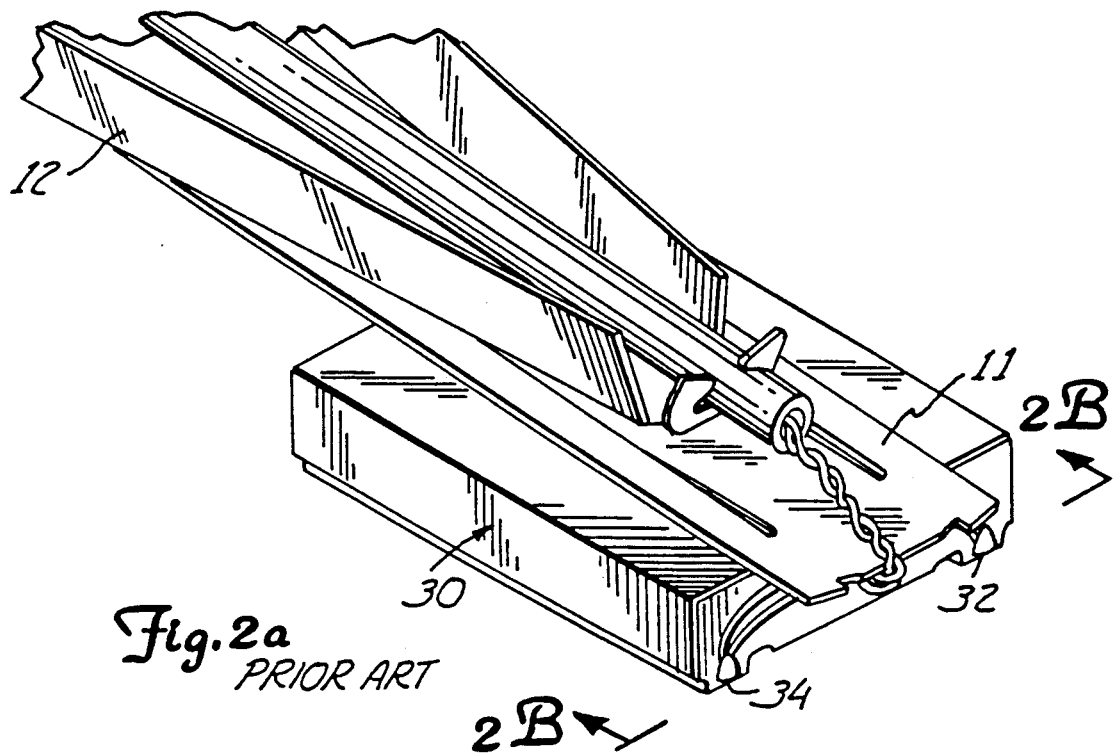
FIG. 2a is a perspective view of a head-gimbal assembly having a conventional catamaran slider.
Figure 2B:
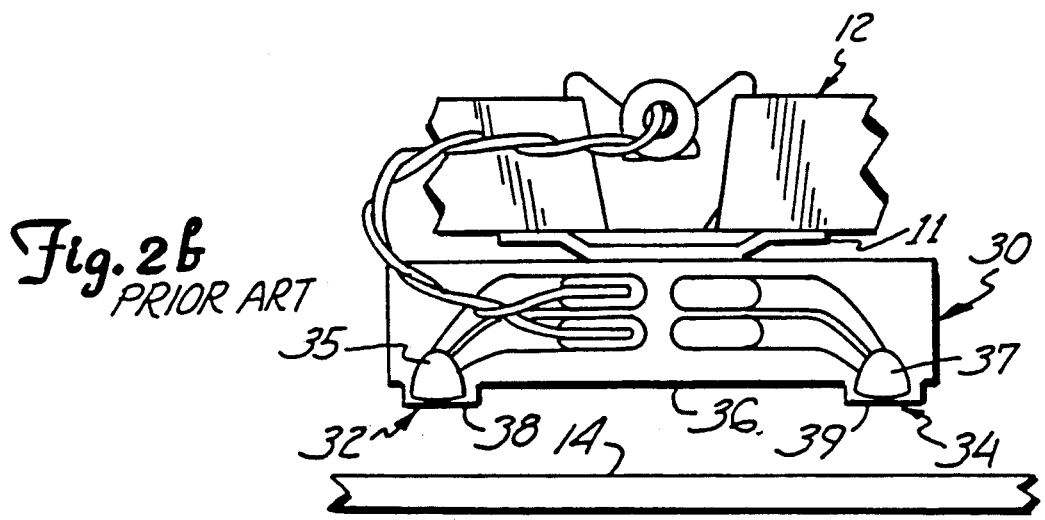
Figure 2C:
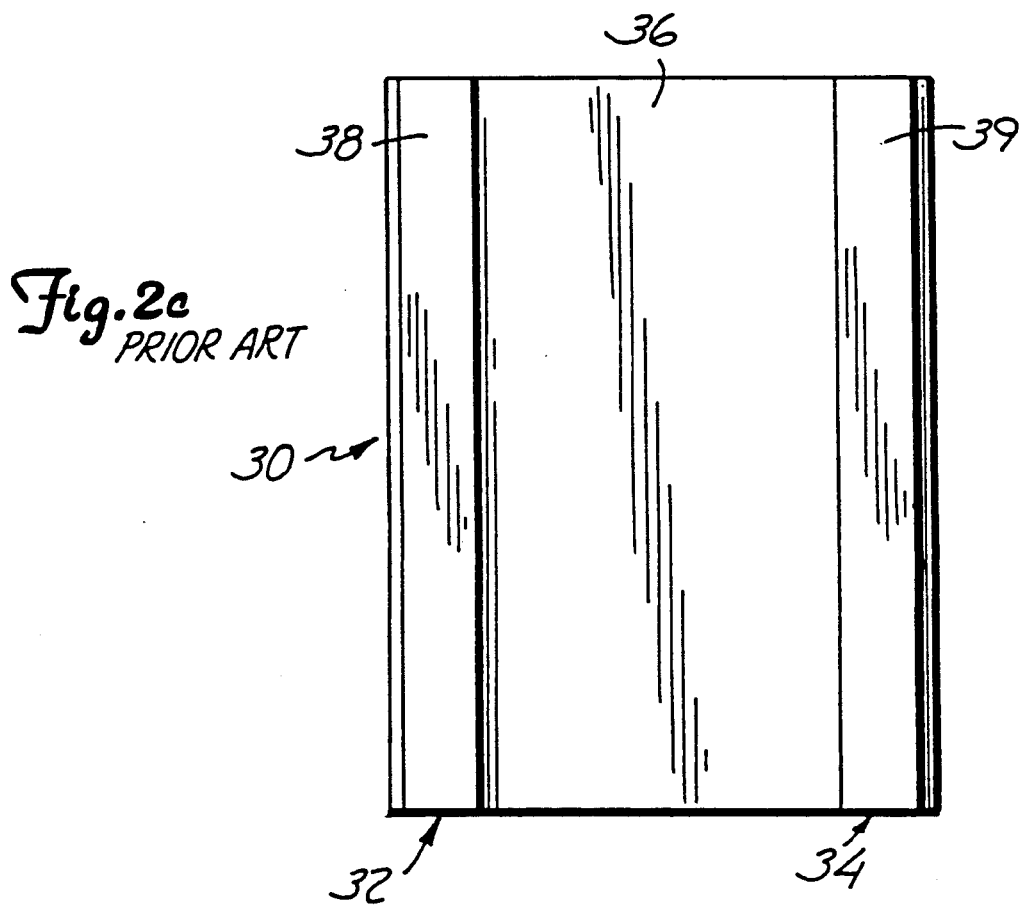
FIG. 2c is a bottom plan view of the conventional catamaran air bearing slider of FIGS. 2a and 2b.

Typically, a gimbal spring connects the slider 70 to an actuator arm, such as the arm 12 shown in FIG. 2a. The gimbal spring includes a dimple that provides a pivot about which the slider 70 can pitch and roll while following the topography of the disk surface. The hourglass shape of each rail improves pitch stiffness of the air bearing about the point at which the dimple contacts the slider 70. Because the air pressure bleeds off near the breaks 82 and 84, the "area elements" of the air bearing surfaces 78 and 80 having vertical stiffness (formed by positive pressure) are concentrated near the leading and trailing edges 86 and 88 of the slider 70, remote from the pivot point. Thus, the vertical stiffness of each area element is "multiplied" by a longer moment arm to give a higher pitch stiffness.

Creating the hourglass shapes by applying the edge steps 76 to each rail such that they terminate prior to the leading and trailing edges 86 and 88 also improves, or reduces, flying height sensitivity to crown height variations. The air bearing surfaces 78 and 80 are not perfectly flat from the leading edges 86 to the trailing edges 88, but are slightly convex. There are two causes for the convex shape. First, manufacturing errors in the process of securing the slider 70 to the gimbal cause deformation of the slider. Second, designers intentionally "round" the air bearing surfaces 78 and 80 to reduce wear on the surfaces. The crown height is a measure of the degree of roundness and can vary from one slider to the next. An increase in the crown height causes the pressure to increase near the mid-sections of the air bearing surfaces 78 and 80 which causes an increase in flying height. However, the edge steps 76 counteract this effect. Since the edge steps 76 cause the air pressure to bleed off near the mid-sections, an increase in crown height has a negligible effect on the air pressure near the mid-sections. Therefore, the hourglass shapes reduce the flying height sensitivity to crown height variations. The hourglass shapes also reduce flying height sensitivity to low frequency disk waviness, since the disk waviness affects pressure on the air bearing surfaces 78 and 80 similar to crown height variation.

FIGS. 7-10 are greatly enlarged sectional views of a rail, such as rail 74, taken along line 7—7 of FIG. 6 and illustrate alternative edge step embodiments. FIG. 7 illustrates an embodiment in which the edge steps 76 are "true" steps. FIG. 8 illustrates an alternative embodiment in which the edge steps 76 are chamfered. FIG. 9 illustrates another alternative embodiment in which the edge steps 76 are wide, shallow chamfers between the air bearing surface 80 and the inside and outside edges of the rail 74. FIG. 10 illustrates another alternative embodiment in which the edge steps 76 are shallow edge blends. It should be understood that any one of these embodiments, or a combination of them, may be used within the scope of the present invention.

FIG. 11 illustrates an hourglass slider similar to slider 70 shown in FIG. 6, but having a cross-rail. Sliders having cross-rails are typically called negative pressure air bearing (NPAB) sliders, as opposed to catamaran sliders which do not have cross-rails. An hour-glass NPAB slider 110 includes rails 112 and 114 having air bearing surfaces 116 and 118, respectively. A cross-rail 120 extends between the rails 112 and 114. In the preferred embodiment, the cross-rail 120 is positioned closer to the leading edge 121 than the trailing edge 123.

During operation, the cross-rail 120 creates a negative pressure area 122 which counteracts the positive pressure built along the air bearing surfaces 116 and 118 and increases slider stability and stiffness. The negative pressure area 122 is created between the rails 112 and 114 and between the cross-rail 120 and a trailing edge 123.

The slider 110 further includes edges steps 125. The cross-rail 120 and edge steps 125 may be etched to approximately 0 to 2.0 microns below the air bearing surfaces 116 and 118. The edge steps 125 are relatively shallow compared to the negative pressure area 122 which is etched to about 10 microns below the air bearing surfaces 116 and 118. The edge steps 125 are drawn out of scale and actually look similar to the edge steps 76 shown in FIG. 8. To maximize the slider stiffness, the edge steps 125 are applied to each rail, such that they terminate prior to the leading and trailing edges 142 and 124. This maximizes the air bearing surface area that develops positive pressure near the ends of the rails 112 and 114 while maximizing the negative pressure area 122 near the center of the slider 110. As a result, the counteraction between the positive and negative pressure is maximized to improve the slider stiffness.

The shallow edge steps 125 accumulate additional pressure. When slider 110 flies at skew, the additional pressure that accumulates on the edge steps 125 reduces the effect of skew angle on fly height by reducing shifts in the pressure distributions across the air bearing surface areas 116 and 118. The result is a more constant fly height over varying skew angles $\phi$. The slider 110 is also relatively insensitive to crown height variation and disk waviness (see discussion with reference to FIG. 6).

FIG. illustrates an alternative rail geometry that may be used with or without the cross rail 120. Elongated breaks 126 and 128 divide the air bearing surfaces 116 and 118 into three portions. The air bearing surface 116 is divided into a forward surface 130, a central surface 132, and a rearward surface 134. Similarly, the air bearing surface 118 is divided into a forward surface 136, a central surface 138, and a rearward surface 140. The breaks 126 and 128 are spaced from the leading edges 142 by approximately one-third the length of the slider 110. As a result, the forward surfaces 130 and 136 are smaller than rearward surfaces 134 and 140. The central surfaces 132 and 138 have generally rectangular shapes.

The negative pressure area 122 created by the crossbar 120 reduces flying height sensitivity to tangential disk velocity. As the disk rotates, the air velocity beneath the air bearing surfaces is greater at the outer radius of the disks than at the inner radius. Therefore, the positive pressure built along each air bearing surface is greater at the outer radius than at the inner radius. However, the negative pressure also increases at the outer radius. The increase in negative pressure counteracts the increase in positive pressure to reduce changes to flying height caused by changes in air velocity.

The hourglass air bearing surfaces 116 and 118 further reduce changes in flying height caused by changes in air velocity. At higher air speeds, increases in positive pressure are greater than increases in negative pressure. Since the air bearing surfaces 116 and 118 are narrower at the central surfaces 132 and 138, the positive pressure bleeds off into the negative pressure cavity 122 to reduce increases in positive pressure. The positive pressure is even further reduced since the area of greatest negative pressure, the central region of the negative pressure area 122, is adjacent the central surfaces 132 and 138. Therefore, the negative pressure area 122 draws more air off of the central surfaces 132 and 138 to further reduce increases in positive pressure. As a result, changes in positive and negative pressure remain substantially equal over varying tangential disk velocities.

The present invention for a slider having hourglass rails provides a near constant air bearing surface area and pressure distribution while flying at varying skew angles and disk velocities. As a result, the slider having hourglass rails has improved flying characteristics over the prior art.

Although the present invention has been described with reference to preferred embodiments, workers skilled in the art will recognize that changes may be made in form and detail without departing from the spirit and scope of the invention.

What is claimed is:

1. An air bearing disk head slider for supporting an electromagnetic transducer proximate a rotating magnetic disk, the slider comprising:
   a slider body having a surface with a leading edge, a trailing edge, and first and second slide edges; and
   first and second raised side rails positioned along the first and second side edges, respectively, the first and second side rails each forming an air bearing surface with an inside and an outside edge extending between the leading edge and the trailing edge, the inside and outside edges converging from the leading edge to a central region of the air bearing surface and diverging from the central region to the trailing edge to form inside and outside surfaces above the slider body surface that are recessed from the air bearing surface by approximately 0 to 2.0 microns.

2. The air bearing disk head slider of claim 1 wherein the first and second side rails include tapered leading edges for establishing an air pressure transition between ambient air and pressurized air beneath the first and second side rails.

3. The air bearing disk head slider of claim 1 wherein each air bearing surface includes a forward surface and a rearward surface, the forward surface being positioned between the leading edge and the central region and the rearward surface being positioned between the central region and the trailing edge.

4. The air bearing disk head slider of claim 3 wherein the rearward surface has an area that is larger than the forward surface.

5. The air bearing disk head slider of claim 3 wherein the central region of each air bearing surface has a substantially rectangular shape.

6. The air bearing disk head slider of claim 1 wherein the central region of each air bearing surface is spaced from the leading edge by about one-third the length of the first and second rails, as measured from the leading edge to the trailing edge.

7. The air bearing disk head slider of claim 1 wherein each air bearing surface has substantially equal widths near the leading and trailing edges and has a width near the central region which is substantially equal to half of the widths near the leading and trailing edges.

8. The air bearing disk head slider of claim 1 wherein the first and second side rails project out from the slider body by about 10 to 30 microns.

9. The air bearing disk head slider of claim 1 wherein the inside and outside edges include edge steps.

10. The air bearing disk head slider of claim 1 wherein the inside and outside edges include edge blends.

11. The air bearing disk head slider of claim 1 wherein the inside and outside edges include chamfer means.

12. The air bearing disk head slider of claim 1 wherein the recessed inside surfaces have different dimensions than the recessed outside surfaces.

13. The air bearing disk head slider of claim 1 and further comprising cross-rail means extending between the first and second side rails for creating a negative pressure area between the cross-rail means and the trailing edge.

14. The air bearing disk head slider of claim 13 wherein the cross-rail means is positioned closer to the leading edge than to the trailing edge.

15. The air bearing disk head slider of claim 13 wherein the cross-rail means is recessed from the air bearing surfaces by about 0 to 2.0 microns.

16. An air bearing disk head slider for supporting an electromagnetic transducer proximate a rotating magnetic disk, the slider comprising:
   a slider having a surface with a leading edge, a trailing edge, first and second side edges; and
   first and second raised side rails positioned along the first and second side edges, respectively, the first and second side rails each forming an air baring surface with an inside edge and an outside edge extending between the leading edge and the trailing edge, a portion of the inside and outside edges converging together toward a central region of the air bearing surface to form surfaces above the slider body surface that are recessed from the air bearing surface by approximately 0 to 2.0 microns.

17. The air bearing disk head slider of claim 16 wherein the converging portions of the inside and outside edges are linear.

18. The air bearing disk head slider of claim 16 wherein the converging portions of the inside and outside edges are curved.

19. The air bearing disk head slider of claim 16 wherein the converging portions of the inside and outside edges include edge steps.

20. The air bearing disk head slider of claim 16 wherein the converging portions of the inside and outside edges include edge blends.

21. The air bearing disk head slider of claim 16 wherein the converging portions of the inside and outside edges include chamfer means.

22. The air bearing disk head slider of claim 16 and further comprising cross-rail means extending between the first and second side rails for creating a negative pressure area between the cross-rail means and the trailing edge.

23. A negative pressure air bearing disk head slider for supporting an electromagnetic transducer proximate a rotating magnetic disk, the slider comprising:
   a slider body having a surface with a leading edge, a trailing edge, and first and second side edges;
   first and second raised side rails positioned along the first and second side edges, respectively, the first and second side rails each forming an air bearing surface with an inside and an outside edge extending between the leading edge and the trailing edge, the inside and outside edges converging from the leading edge to a central region of the air bearing surface and diverging from the central region to the trailing edge to form inside and outside surfaces above the slider body surface that are recessed from the air bearing surface by approximately 0 to 2.0 microns; and cross-rail means extending between the first and second side rails for creating a negative pressure area between the cross-rail means and the trailing edge.

24. The negative pressure air bearing disk head slider of claim 23 wherein the first and second side rails include tapered leading edges for establishing an air pressure transition between ambient air and pressurized air beneath the first and second side rails.

25. The negative pressure air bearing disk head slider of claim 23 wherein each air bearing surface includes a forward surface and a rearward surface, the forward surface being positioned between the leading edge and the central region and the rearward surface being positioned between the central region and the trailing edge.

26. The negative pressure air bearing disk head slider of claim 23 wherein the rearward surface has an area that is larger than the forward surface.

27. The negative pressure air bearing disk head slider of claim 23 wherein the central region of each air bearing surface has a substantially rectangular shape.

28. The negative pressure air bearing disk head slider of claim 23 wherein the central region of each air bearing surface is spaced from the leading edge by about one-third the length of the first and second rails, as measured from the leading edge to the trailing edge.

29. The negative pressure air bearing disk head slider of claim 23 wherein each air bearing surface has substantially equal widths near the leading and trailing edges and has a width near the central region which is substantially equal to half of the widths near the leading and trailing edges.

30. The negative pressure air bearing disk head slider of claim 23 wherein the inside and outside edges include edge steps.

31. The negative pressure air bearing disk head slider of claim 23 wherein the inside and outside edges include edge blends.

32. The negative pressure air bearing disk head slider of claim 23 wherein the inside and outside edges include chamfer means.

33. The negative pressure air bearing disk head slider of claim 23 wherein the recessed inside surfaces have different dimensions than the recessed outside surfaces.

* * * * *

UNITED STATES PATENT AND TRADEMARK OFFICE
CERTIFICATE OF CORRECTION

PATENT NO. : 5,062,017

DATED : October 29, 1991

INVENTOR(S) : Richard A. Strom, et al

It is certified that error appears in the above-identified patent and that said Letters Patent is hereby corrected as shown below:

Col. 10, line 30, delete "baring" and insert --bearing--.

Col. 11, line 25, delete "claim 23" and insert --claim 25--.

Col. 12, line 2, delete "claim 23" and insert --claim 25--.

Signed and Sealed this

Sixteenth Day of March, 1993

Attest:

STEPHEN G. KUNIN

Attesting Officer

Acting Commissioner of Patents and Trademarks